Feb. 27, 1934.  M. SMOLENSKY  1,949,191
STRAIGHT FLOW STOP VALVE
Filed Sept. 11, 1930
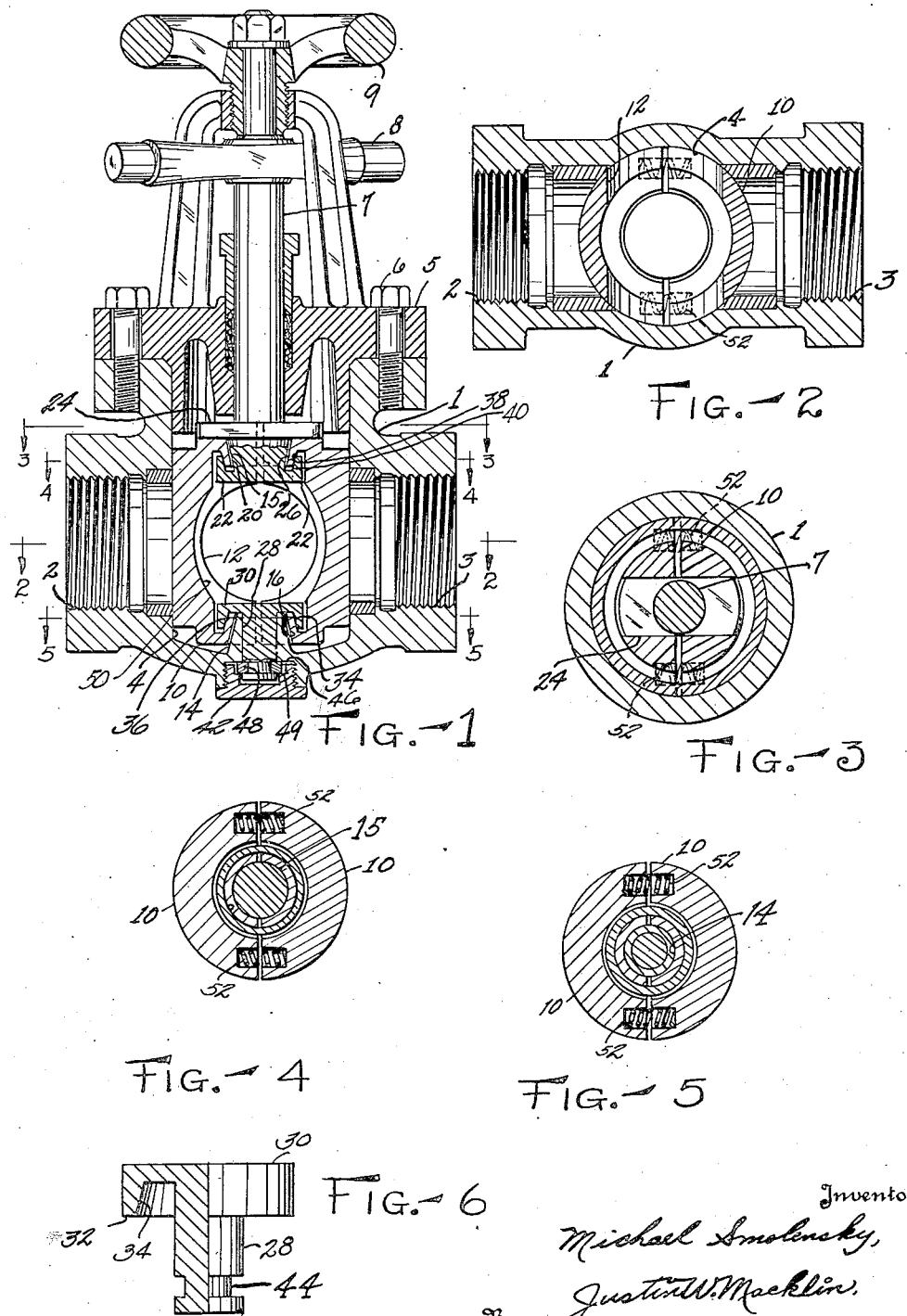
Inventor
Michael Smolensky,
By Justin W. Macklin.
his Attorney Patented Feb. 27, 1934

1,949,191

UNITED STATES PATENT OFFICE 1,949,191

STRAIGHT FLOW STOP VALVE

Michael Smolensky, Garfield Heights, Ohio

Application September 11, 1930
Serial No. 481,174

7 Claims. (Cl. 251—102)

This invention relates to stop valves and is particularly concerned with straight flow stop valves such as described in my copending application Serial No. 448,838, filed May 1, 1930. The present invention is an improvement in such a valve by which I obtain smoother and more nearly perfect operation and eliminate some difficulties heretofore encountered.

As more fully described in my copending application, my valve comprises a hollow valve body adapted for connection in a pipe line. In the body is mounted a plug divided into severed sections and having a central bore of substantially the same diameter as the pipe line with which the valve is associated. The separate sections of the plug are so arranged that when they are positioned to place the bore thereof in axial alignment with the openings in the body, the sections of the plug may be spread apart and placed in stressed engagement with the inner wall of the body, thus forming practically a full diameter pipe directly through the valve. By relieving the spreading action and rotating the plug, for instance a quarter of the turn, the solid walls of the plug may be placed over the openings in the body and the sections of the plug again spread apart as described, so that they tightly engage the inner wall of the valve body and effectively seal the openings.

However, in such a valve there is a tendency for the plug sections to remain apart and tight against the inner wall of the valve body after they have been placed in engagement therewith and especially when they have been retained in one position for a considerable period of time. One reason for this is that the chemicals in the water tend to cement the working parts together. Again in the case of large and heavy valves, friction between the plug and body renders rotation of the plug difficult.

My present invention is primarily concerned with overcoming this difficulty by a releasing member which tends to draw the two plugs together when the spreading action is relieved to turn the valve plug from one operating position to another.

A convenient form and arrangement of parts which effectively accomplish these results will be more fully described in the following specification, in which reference is made to the drawing, the same numbers being used to designate the same parts in the various views.

In the drawing—

Fig. 1 is a sectional view of a valve embodying my invention.

Fig. 2 is a cross sectional view of the valve illustrated in Fig. 1 and is taken on a plane indicated by the line 2—2 of Fig. 1.

Fig. 3 is a partial cross sectional view of the operating members of the valve shown in Fig. 1 and is taken on a plane indicated by the line 3—3 of Fig. 1.

Figs. 4 and 5 are partial cross sectional views of the working parts of the valve illustrated in Fig. 1 and are taken on planes indicated by the lines 4—4 and 5—5 respectively of Fig. 1.

Fig. 6 is an enlarged view of one form of the plug releasing member, part thereof being shown in section for clearness in illustration.

The form of stop valve shown in the drawing includes a body 1 provided with suitable means, such as threaded bores 2 and 3, for connecting the valve in a pipe line. The body has a hollow portion or bore 4, preferably cylindrical, communicating with the openings 2 and 3. The upper end of the bore 4 is sealed by a hood 5, secured to the body by bolts 6.

To open and close the openings 2 and 3, I provide a closure plug 10 within the bore 4, the plug preferably being in the form of a cylinder fitting the inner wall of the bore 4 and capable of being rotated about its own axis within the bore. The plug is provided with a central bore 12 of substantially the same diameter as the openings 2 and 3. The bore 12 extends transversely of the plug so that when the plug is rotated the bore 10 may be placed in axial alignment with the openings 2 and 3 to form an unrestricted passage through the valve or closed areas of the plug may be placed over the openings 2 and 3 to block the same. It is desirable that the plug 10 be capable of being easily turned in the bore 4 to open and close the openings 2 and 3, as described.

Consequently, the outer cylindrical surfaces of the plug and the side walls may be machined comparatively smooth, a grinding fit being unnecessary in my invention. The plug 10 is formed or split into separate sections, preferably two sections, along a plane through its axis and the axis of the central bore 12. The space between the two sections is comparatively small but permits the two sections to be drawn together slightly to provide a slight clearance between the plug 11 and the inner walls of the central bore 4.

Obviously, when the sections of the plug 10 are thus brought together, they may be rotated freely in the bore. In order that the plug sections may be spread apart in predetermined positions for opening and sealing the valve, as described above, I provide a lug or pivotal wedge 14. The wedge 14 is secured to the body 1 at the base of and coaxial with the bore 4, and is preferably frusto-conical in form, the small end being toward the plug 10. The lug 14 is centrally tapped for a purpose later to be described.

The plug 10 is recessed as at 16, to provide annular surfaces complementary to the frusto-conical portion of the wedge or lug 14. Mounted in the hood 5 and axially aligned with the plug 10 is an operating stem 7. The stem extends into the bore 4, the opening being sealed by a suitable packing. The stem 7 is rotatable relative to the hood 5 and body 1 by a handle 8, rigidly secure thereto, and is movable axially by rotation of the handle 9, which is slip fitted on the stem and is in threaded engagement with legs on the hood 5. The inner end of the stem 7 carries an operating lug 15, rigid therewith. The body 18 of the lug 15 is frusto-conical in form, the smaller end being toward the plug 10, and terminates in an enlarged head 22, later to be described. The upper end of the lug 15 is provided with projecting shoulders 24 which may engage a channel in the plug 10 for rotating the same. The shoulders are preferably positioned so as to bridge across the sections of the plug 10, as illustrated in Fig. 3, eliminating any tendency of the shoulders 24 wedging the sections of the plug 10 apart as it rotates them. The sections of the plug 10 are tapped to form annular surfaces 26, complementary to the body 18 of the lug 15.

Obviously as the stem is moved downwardly the frusto-conical body 18 of the lug 15 engages the complementary annular surfaces 26 of the plug 10 and concurrently the wedge 14 engages the complementary annular surfaces 16. This action wedges the sections of the plug 10 relatively apart and into stressed engagement with the inner wall of the bore 4. When it is desired to turn the plug in the bore these wedge members must be partially withdrawn so that the plug sections are free to move relatively together and slightly clear of the bore 4. At the same time the sections of the plug 10 should be drawn together.

In order to accomplish this result I provide an annular cam head 22, above mentioned, on the lug 15. In the bore of the frusto-conical lug 14 of the body 1, I mount a rotatable pin 28 having an annular cam head 30, similar to the cam head 22. Since the cam heads 22 and 30 are similar, the description of the cam head 30 only will be given. As better illustrated in Fig. 6, the head may be in the form of a comparatively wide disk having an annular flange 32 on the lower or outer surface. The inner face of this flange slopes inwardly of the head from the lower or outer side defining a frusto-conical shoulder 34 coaxial with the head 30 and having its smaller end toward the plug 10. The sections of the plug 10 are recessed to form, conjointly, an annular passage to receive the flange 32 and to form an annular shoulder 36 complementary to the shoulder 34.

The other end of the plug 10 is similarly provided with a frusto-conical shoulder 38, sloping outwardly from the bore 4, for engagement with a complementary internal annular shoulder 40 of the cam head 22. The complementary surfaces of these shoulders are preferably machined smooth for efficient operation.

Assuming that the valve plug sections have been stressed into engagement with the wall of the bore 4 in the position illustrated in Figs. 1 and 2 so as to seal the passages 2 and 3 and it is desired to open the valve, the handle 9 is rotated so as to lift the stem 5 axially. This causes the annular shoulder 40 on the cam head 22 to engage the complementary shoulder 38 on the valve plug sections, thus tending to lift the plug and move the sections inwardly relatively together by a cam or wedging action. Obviously a slight lift of the plug sections causes a similar engagement between the annular shoulders 36 of the plug and the complementary annular shoulders 34 of the cam head 30, thus drawing the lower ends of the plug sections relatively together. In this manner the plug sections are moved inwardly and clear the wall of the bore 4, and are ready to be turned into a predetermined operating position.

As described, pin 28 is rotatable within the bore of the lug 14, but is fixed in position axially thereof in a manner later to be described.

Consequently when the cam heads are drawn relatively apart by drawing the stem 5 outwardly, the sections of the plug, the operating stem 5, and the pin 28 are brought into stressed engagement with each other, so that while this condition exists they form practically a rigid structure. The stem 5 may then be rotated by the handle 8 and rotates the plug to a desired position for sealing or communicating the passages 2 and 3, the pin 28 rotating in the bore of the frusto-conical lug 14.

When the plug sections have been rotated to the positions desired, the operating stem is moved inwardly of the body by rotation of the handle 9, and the frusto-conical body portions of the lugs 14 and 15 come into engagement with the complementary surfaces 16 and 26, respectively, on the plug sections. At the same time annular shoulders 36 and 38 of the plug release from the complementary shoulders 34 and 40 respectively. Thus the sections of the plug are spread relatively apart and into engagement with the wall of the bore 4.

As mentioned above the pin 28 is mounted in the bore of the lug 14. The body 1 is likewise tapped and threaded to receive a closure plug 42, the tap being coaxial with that of the pin 28 but of larger diameter, thus forming an annular shoulder 46 in the body 1. The lower or outer end of the pin 28 is provided with an annular channel 44. A segmental collar 48, preferably made in two pieces, adapted to lie in the annular channel 44, is then placed in the channel. The outer diameter of the collar 48 is greater than that of the pin 28. The collar engages the annular shoulder 46 in the body 1 and prevents axial inward movement of the pin 28. The closure plug 42 is provided with a threaded annular flange 43, of such thickness that when the plug is fastened into the bore, this flange engages or lies close to the outer cylindrical surface of the segmental collar, thus holding it in position. The closure plug may also be provided with an internal annular shoulder 49 to engage the lower side of the collar and hold it firmly against the shoulder 46. In this manner the pin 28 is held firmly but rotatably in place.

To permit fluid to enter these annular recesses and flush out any foreign matter, I increase the size of the central part of the bore 4, giving it a somewhat elliptical shape, as indicated at 50. This allows water or other fluid to pass freely around the working parts with sufficient flow to carry away any foreign matter and eliminates any pockets.

In order that the outer surfaces of the plug 10 and the walls of the bore 4 may be held in contact so that they may wear each other to a smooth fit, springs 52 are provided as illustrated. These springs may be held in suitable bores in the plug sections, as illustrated, and normally urge the sections apart. When the spreading and contracting shoulders and cam surfaces are in idle position, the springs 52 hold the plug sections separated and against the walls of the bore 4, yet permit them to be relatively rotated to grind their contact surfaces. For purposes of clearness the springs 52 have been omitted from Fig. 1 of the drawing.

While by way of illustration I have described a valve having one inlet passage and one discharge passage, I do not intend to limit my invention to the form or number of passages shown but intend to include various forms which may embody the general principles thereof and any number and combination of passages. For instance, an effective by-pass valve or control valves for distributing fluid through a number of different outlets or in different volumes are applications of the principles of my invention.

I claim:

1. A stop valve comprising a hollow body having passages therein communicating with a pipe line, a plug within said body having a transverse bore, said plug being divided into a plurality of sections, a stem for moving said plug to communicate said passages and bore and to close said passages selectively, there being separate operating means at opposite ends of the plug operable to force the sections toward and away from each other, and means on the stem by which both said operating means are rendered operable upon axial movement of the stem in opposite directions to move the plug sections relatively into expanded and contracted positions in the body.

2. A stop valve comprising a hollow body having passages therein communicating with a pipe line, a plug within said body having a transverse bore, said plug being divided into a plurality of sections, a stem for moving said plug to communicate said passages and bore and to close said passages selectively, cams on said stem and in said body engaging said plug sections for moving the same relatively apart, when the cam means are moved toward each other, oppositely acting cams on said stem and in said body engaging said plug sections for moving said plug sections relatively together when said cams are moved away from each other, the first mentioned cam means being operable consequent upon inward axial movement of said stem and the last mentioned cam means being operable consequent upon movement of said stem in the opposite direction.

3. A stop valve comprising a body having inlet and outlet passages therein, a split plug within said body, said plug having a transverse bore and being divided into a plurality of sections, rotatable means to rotate said plug sections into position to communicate said body passages and said transverse bore and to offset said transverse bore and body passages, a stem operable from the outside of the body and movable axially inwardly and outwardly independently of rotation of said plug and rotatable means, separate means on said stem and in said body operatively connected respectively to the opposite end portions of said plug sections for moving the plug sections relatively apart consequent upon axial movement of said stem in one direction and for moving said plug sections relatively together consequent upon movement of said stem in the opposite direction.

4. A stop valve, comprising a body having inlet and outlet passages, a split plug within said body, said plug having a transverse bore and being divided into a plurality of sections, a rotatable stem for rotating said plug sections to communicate said body passages and bore and to offset said body passages and bore selectively, means on said stem operably connected to the adjacent ends of the plug sections, additional means in the body operably connected to the opposite ends of the plug sections, both of said means being operable concurrently for moving the plug sections relatively apart consequent upon axial movement of said stem in one direction and for moving said plug sections relatively together consequent upon opposite axial movement of said stem, said additional means being rotatably mounted in said body, said stem being movable axially independent of rotation thereof for operating both of said means preparatory to rotation thereof.

5. A stop valve comprising a body having an inlet passage and an outlet passage, a split plug within said body, said plug comprising a plurality of sections and being rotatable to different positions for communicating and discommunicating the body passages, means to rotate the plug, a stem mounted for axial movement in the body, separate means on said stem and in said body operatively connected respectively to the opposite end portions of the plug sections and operable for moving the plug sections relatively apart consequent upon axial movement of the stem in one direction and for moving the plug sections relatively together consequent upon axial movement of the stem in the opposite direction.

6. A stop valve comprising a body having an inlet and an outlet passage, a split plug within said body adapted to communicate and discommunicate the body passages consequent upon rotation of the plug, means for rotating the plug, a stem mounted in said body for axial travel, means on said stem operably connected to the adjacent end portions of the plug sections, additional means in the body operatively connected to the opposite end portions of the plug sections, both of said means being operable concurrently for moving the plug sections relatively apart consequent upon axial movement of the stem in one direction and for moving the plug sections relatively together consequent upon axial movement of the stem in the opposite direction, said additional means being rotatably mounted in said body.

7. A stop valve comprising a body having an inlet passage and an outlet passage, a split plug in the body, said plug having a transverse bore and being divided into a plurality of sections, a stem for rotating said plug sections into position to communicate and discommunicate the body passages, said stem being mounted for axial movement in said body independently of rotation, separate means on the stem and in the body operatively connected to opposite end portions of the plug sections and operable consequent upon axial movement of the stem in the opposite directions to expand and retract the plug sections.

MICHAEL SMOLENSKY.